United States Patent
Golko et al.

(10) Patent No.: US 9,153,925 B2
(45) Date of Patent: Oct. 6, 2015

(54) PLUG CONNECTOR HAVING A TAB WITH A PLURALITY OF CONDUCTORS

(71) Applicant: APPLE INC., Cupertino, CA (US)

(72) Inventors: Albert J. Golko, Saratoga, CA (US); Warren Z. Jones, San Jose, CA (US); Ibuki Kamei, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/025,662

(22) Filed: Sep. 12, 2013

(65) Prior Publication Data

US 2015/0072565 A1    Mar. 12, 2015

(51) Int. Cl.
| | |
|---|---|
| H01R 13/52 | (2006.01) |
| H01R 43/20 | (2006.01) |
| H01R 43/24 | (2006.01) |
| H01R 13/405 | (2006.01) |
| H04M 1/06 | (2006.01) |
| H01R 24/60 | (2011.01) |

(52) U.S. Cl.
CPC ............ *H01R 43/205* (2013.01); *H01R 13/405* (2013.01); *H01R 13/5216* (2013.01); *H01R 43/24* (2013.01); *H04M 1/06* (2013.01); *H01R 24/60* (2013.01)

(58) Field of Classification Search
USPC ..................... 439/519–521, 607.02
See application file for complete search history.

(56) References Cited

U.S. PATENT DOCUMENTS

| | | | | |
|---|---|---|---|---|
| 3,325,769 | A | * | 6/1967 | Travis ........................... 439/496 |
| 5,224,874 | A | * | 7/1993 | Sell ............................... 439/448 |
| 5,385,477 | A | * | 1/1995 | Vaynkof et al. ................. 439/66 |
| 6,004,145 | A | * | 12/1999 | Gasparovic et al. ......... 439/76.1 |
| 7,497,733 | B1 | * | 3/2009 | Van der Steen .......... 439/607.01 |
| 7,674,128 | B2 | * | 3/2010 | Abe et al. ...................... 439/519 |
| 8,708,745 | B2 | | 4/2014 | Golko et al. |
| 2004/0266255 | A1 | * | 12/2004 | Lee ................................ 439/497 |
| 2011/0256761 | A1 | * | 10/2011 | Wu ................................ 439/580 |
| 2011/0256764 | A1 | * | 10/2011 | Wu ........................... 439/607.01 |
| 2014/0073193 | A1 | * | 3/2014 | SooHoo et al. ............... 439/661 |
| 2014/0213110 | A1 | * | 7/2014 | Wu et al. ................... 439/607.22 |

* cited by examiner

*Primary Examiner* — Chandrika Prasad
(74) *Attorney, Agent, or Firm* — Kilpatrick, Townsend & Stockton, LLP

(57) ABSTRACT

A dual orientation connector having a connector tab with first and second major opposing surfaces and a plurality of electrical contacts carried by the connector tab. A retainer is positioned at an entrance end of the tab and is overmolded on a portion of a carrier. The carrier has a first portion positioned within the tab, a second portion extending through the retainer and a third portion extending out of the retainer at an angle with respect to the longitudinal plane of the tab. The carrier has a plurality of conductors formed thereon and extending from the first portion to the third portion.

20 Claims, 10 Drawing Sheets

Section A-A

PLUG CONNECTOR HAVING A TAB WITH A PLURALITY OF CONDUCTORS

BACKGROUND OF THE INVENTION

The present invention generally relates to electrical connectors and in particular to connector modules that can be readily incorporated into electronic devices and docking stations.

A wide variety of electronic devices are available for consumers today. Many of these devices have connectors that facilitate communication with and/or charging of a corresponding device. Typically these connectors are part of a male plug connector and female receptacle connector system in which the plug connector can be inserted into and mated with the receptacle connector so that digital and analog signals can be transferred between the contacts in each connector. More often than not, the female connector in the connector system is included in a host electronic device such as a portable media player, a smart phone, a tablet computer, a laptop computer, a desktop computer or the like. The plug connector in the connector system is often included in an accessory device such as a charging cable, a docking station, an audio sound system or the like. In some instances, however, devices, for example cable adapters, include both receptacle and plug connectors. Also, in some instances, the plug connector/receptacle connector pairing can be part of a large ecosystem of products that includes both host electronic devices and accessory devices designed to work together. Thus, the same general format plug connector can be incorporated into many different accessories, which in turn can be designed to operate with multiple different host devices that include the corresponding receptacle connector.

BRIEF SUMMARY OF THE INVENTION

Embodiments of the invention pertain to plug connectors that can function within an ecosystem of products, many of which are adapted to work with dual orientation (also referred to as "reversible") connectors. Some embodiments of the invention pertain to plug connectors with contacts formed on both sides of the connector that are configured to mate with a receptacle connector in an accessory that often mates with a reversible connector. One example of such an accessory is a docking station.

Plug connectors according to certain embodiments of the present invention have a reduced plug length and thickness as compared to currently available electronic connectors, and a smooth consistent feel when inserted and extracted from a corresponding receptacle connector.

Other embodiments of the invention pertain to plug connectors with external contacts that include a conductive frame and encapsulant filled within the frame. The plug connector assembly includes a connector tab that extends longitudinally away from a flange. The connector tab includes a first mating surface formed on a first major surface that is opposite a second major surface. In some embodiments a second mating surface may be formed on the second major surface. First and second major surfaces extend from an entrance end to a distal end of the connector tab. A plurality of external electrical contacts are disposed within the first and second mating surfaces. A retainer is positioned at an entrance end of the tab and is overmolded on a portion of a carrier. The carrier has a first portion positioned within the tab, a second portion extending through the retainer and a third portion extending out of the retainer at an angle with respect to the longitudinal plane of the tab. The carrier has a plurality of conductors formed thereon and extending from the first portion to the third portion.

In some embodiments the conductive frame may resemble a hollow shell or metal ground ring, while in other embodiments the conductive frame may resemble a u-shaped band. The conductive frame may have a cavity extending from the entrance end to a pair of windows disposed proximate a distal end on the first and second major surfaces.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF THE INVENTION

As discussed earlier, embodiments of the invention may apply to a variety of plug connectors which use a variety of different connector technologies. Accordingly, the invention may be used with many electronic devices that mate with a variety of electrical connectors in order to receive and provide power and data. One example of an electronic device that may be used with embodiments of the present invention is shown in FIG. 1.

Figure 1:
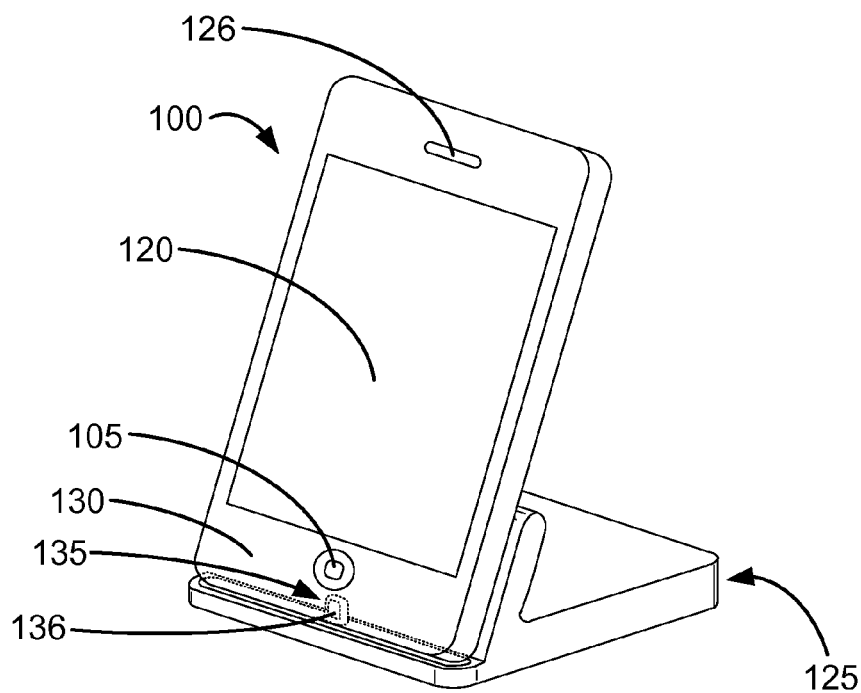
FIG. 1 is an front perspective view of a media player connected to a docking station according to an embodiment of the invention.

FIG. 1 depicts an illustrative rendering of one particular electronic media device 100 attached to a docking station 125. Device 100 includes a multipurpose button 105 as an input component, a touch screen display 120 as both an input and output component, and a speaker 125 as an output component, all of which are housed within a device housing 130. Device 100 also includes a receptacle connector 135 within device housing 130. Receptacle connector 135 can be positioned within housing 130 such that the cavity of the receptacle connector into which a corresponding plug connector 136 is inserted is located at an exterior surface of device housing 130. In some embodiments, the cavity opens to an exterior side surface of device 100. For simplicity, various internal components, such as the control circuitry, graphics circuitry, bus, memory, storage device and other components are not shown in FIG. 1. Embodiments of the invention disclosed herein are particularly suitable for use with plug connectors that are configured to mate with receptacle connector 135, but in some embodiments can also be used with other plugs. Additionally, in some embodiments, electronic media device 100 may have more than one receptacle connector 135 that can be used to physically interface and connect the device (as opposed to a wireless connection which can also be used) to the other electronic devices.

Although device 100 is described as one particular electronic media device, embodiments of the invention are suitable for use with a multiplicity of electronic devices that include a receptacle connector that corresponds to a plug connector including a frame. For example, any device that receives or transmits audio, video or data signals may be used with the invention. In some instances, embodiments of the invention are particularly well suited for use with portable electronic media devices because of their potentially small form factor. As used herein, an electronic media device includes any device with at least one electronic component that may be used to present human-perceivable media. Such devices may include, for example, portable music players (e.g., MP3 devices and Apple's iPod devices), portable video players (e.g., portable DVD players), cellular telephones (e.g., smart telephones such as Apple's iPhone devices), video cameras, digital still cameras, projection systems (e.g., holographic projection systems), gaming systems, PDAs, desktop computers, as well as tablet (e.g., Apple's iPad devices), laptop or other mobile computers. Some of these devices may be configured to provide audio, video or other data or sensory output.

In order to better appreciate the features and aspects of plug connectors according to the present invention, further context for the invention is provided in the following section by discussing one particular implementation of a plug connector according to one embodiment of the present invention.

Figure 2:
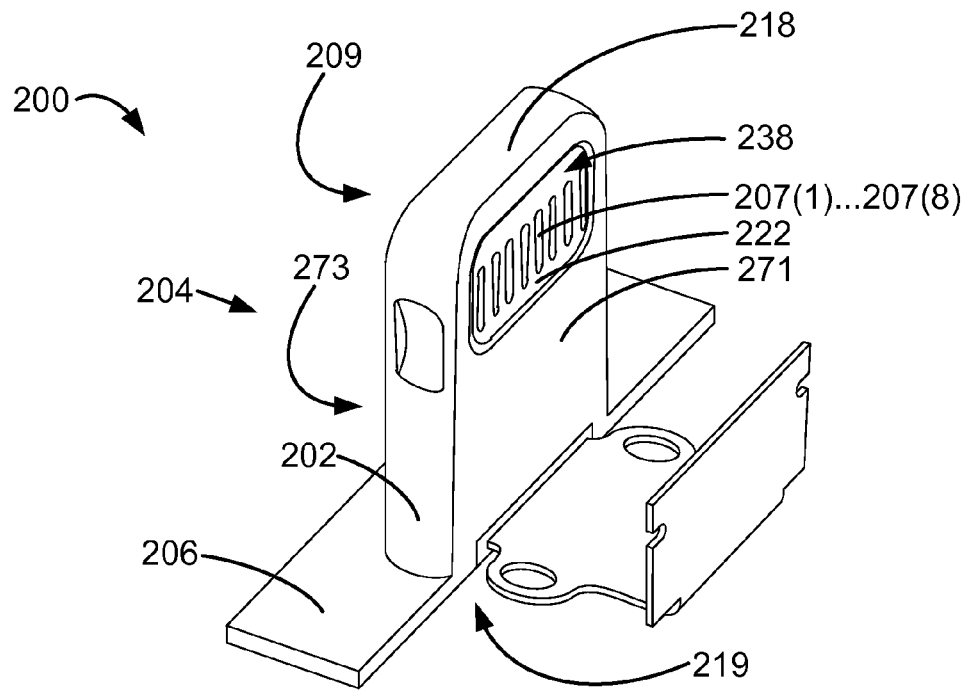
FIG. 2 is a rear perspective view of a plug connector having a carrier and a retainer station according to an embodiment of the invention.

FIG. 2 is a perspective view depicting an eight contact axisymmetric dual orientation plug connector assembly 200 that may include a conductive frame 202 and encapsulant 222 filled within the frame according to embodiments of the present invention. As shown in FIG. 2, plug connector assembly 200 includes a connector tab 204 that extends longitudinally away from a flange 206. Connector tab 204 is sized to be inserted into a corresponding receptacle connector, such as connector 135 (see FIG. 1), during a mating event. Connector tab 204 includes a first mating surface 238 formed on a first major surface 271 that is opposite second major surface 273 of connector tab 204. In some embodiments a second mating surface 209 (not shown) is formed on second major surface 273. A plurality of electrical contacts 207(1) ... 207(8) are disposed at mating surfaces 238, 209. In some embodiments, electrical contacts 207(1) ... 207(8) may be disposed on only one mating surface 238, 209 particularly in embodiments employed in docking stations as the electronic device is always mated in the same orientation. Surfaces 271, 273 extend from an entrance end 219 to a distal end 218 of connector tab 204. When connector tab 204 is inserted into a corresponding receptacle connector, major surfaces 271, 273 fit within a housing of the receptacle connector or host device into which the receptacle connector is incorporated.

Figure 3A:
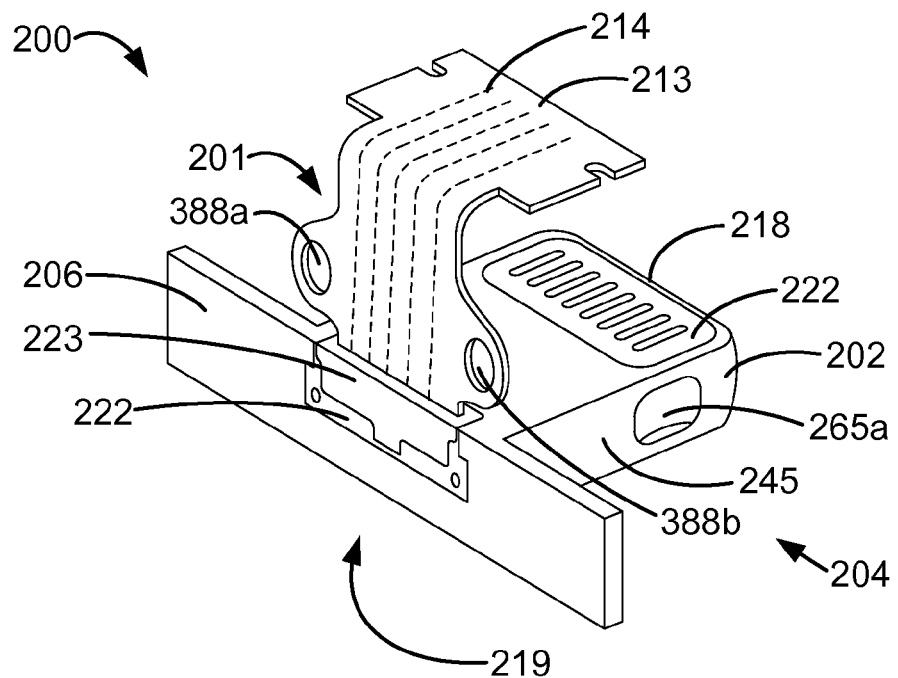
FIG. 3A is a bottom perspective view of a plug connector having a carrier and a retainer station according to an embodiment of the invention.

FIG. 3A is a perspective view of the bottom of plug connector assembly 200. A retainer 223 is positioned at entrance end 219 of tab 204 and may be formed around a carrier 213. In some embodiments retainer 223 is formed from a material different than encapsulant 222. In one embodiment retainer 223 is formed from a liquid crystal polymer (LCP) and encapsulant is a nylon-based polymer. In one embodiment, retainer 223 may be made from a polymer capable of withstanding high temperatures so that carrier 213 may be processed after the retainer is formed. More specifically, after the formation of retainer 223, carrier 213 may have electrical components and/or contacts attached thereto with a process using a relatively high temperature, such as but not limited to soldering. In further embodiments, encapsulant 222 may be a polymer that melts at a low temperature such that conductive frame 202 may be minimally preheated prior to injection of encapsulant.

Carrier 213 has a first portion (not shown) positioned within conductive frame 202, a second portion extending through retainer 223 (not shown) and a third portion 201 extending out of the retainer at an angle with respect to the longitudinal plane of tab 204. Carrier 213 has a plurality of conductors 214 formed thereon and extending from the first portion to third portion 201. Each of plurality of conductors 214 has a contact region formed on the first portion and exposed at an outer surface of plug 200, as explained in more detail below.

FIG. 1 depicts an illustrative rendering of one particular electronic media device 100 attached to a docking station 125. Device 100 includes a multipurpose button 105 as an input component, a touch screen display 120 as both an input and output component, and a speaker 126 as an output component, all of which are housed within a device housing 130. Device 100 also includes a receptacle connector 135 within device housing 130. Receptacle connector 135 can be positioned within housing 130 such that the cavity of the receptacle connector into which a corresponding plug connector 136 is inserted is located at an exterior surface of device housing 130. In some embodiments, the cavity opens to an exterior side surface of device 100. For simplicity, various internal components, such as the control circuitry, graphics circuitry, bus, memory, storage device and other components are not shown in FIG. 1. Embodiments of the invention disclosed herein are particularly suitable for use with plug connectors that are configured to mate with receptacle connector 135, but in some embodiments can also be used with other plugs. Additionally, in some embodiments, electronic media device 100 may have more than one receptacle connector 135 that can be used to physically interface and connect the device (as opposed to a wireless connection which can also be used) to the other electronic devices.

Reference is now made to FIGS. 3A-3L, 4 and 5, regarding the steps associated with the manufacture and assembly of connector 200 (see FIG. 3A) according to one embodiment of the method of the present invention. FIG. 4 is a flow chart that illustrates the general steps associated with the manufacture and assembly of connector 200 according to one embodiment of the invention. FIGS. 3A-3L depict connector 200 at the various stages of manufacture set forth in FIG. 4. FIG. 5 is a flow chart that further details the general step of attaching the contact assembly to the carrier, identified as step 430 in the general manufacturing and assembly process illustrated in FIG. 4.

Figure 3B:
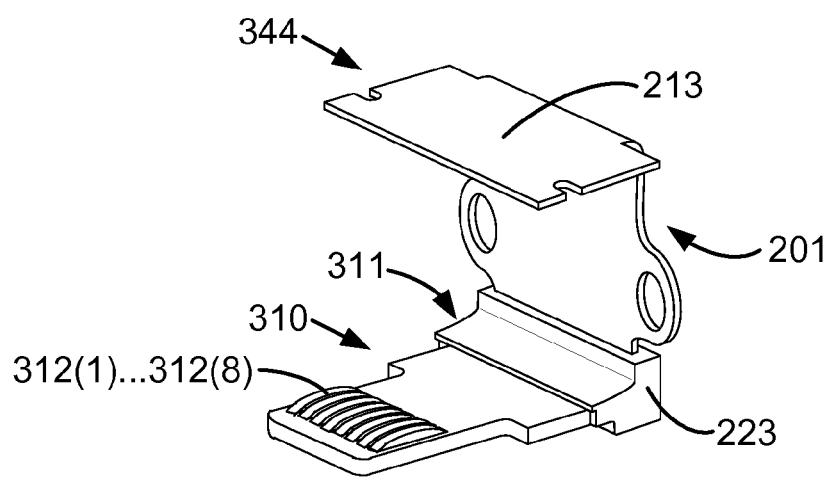
FIG. 3B is a perspective view of a carrier and a retainer station according to an embodiment of the invention.
Figure 3C:
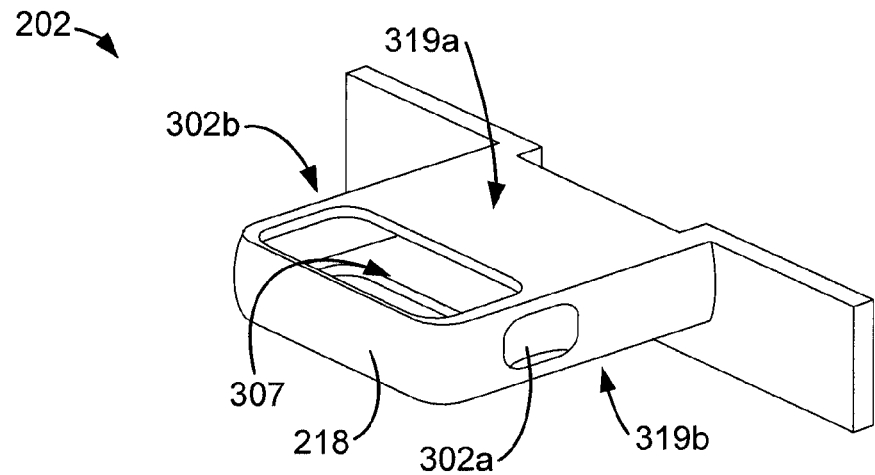
FIG. 3C is a rear perspective view of a conductive frame station according to an embodiment of the invention.

Now referring to FIGS. 3B and 3C, the manufacture of connector 200 may be initiated with the fabrication of conductive frame 202, the construction of carrier 213, and the construction of contact assemblies 316a, 316b (see FIG. 3F) each of which can occur independent of the others in any order. In some embodiments, conductive frame 202 may resemble a hollow shell having feet that protrude from each side of the bottom of the shell, while in other embodiments the conductive frame may resemble a u-shaped band, as discussed below. Conductive frame 202 may have a cavity extending from entrance end 219 to a pair of windows 307 disposed proximate distal end 218 on first and second major surfaces 271, 273. In step 422, conductive frame 202 (see FIG. 3C) may be fabricated using a variety of techniques such as, for example, a metal injection molding process (MIM), a cold heading process or a billet machining process. A MIM process may provide a great deal of flexibility in achieving a desired geometry and can result in a part that is close to the final desired shape with minimal post machining operations. In some embodiments, alternative processes such as plastic injection molding and plating may be used to form conductive frame 202. Pockets 302a, 302b (only 302a is shown in FIG. 3C) and window 307 may be machined or molded into conductive frame 202 and the surface of the conductive frame can be smoothed using a media blasting process. Further, it may be desirable to grind or machine surfaces of conductive frame 202 such as flats 319a, 319b on the top and bottom of the conductive frame. Flats may be formed on first and second major surfaces 271, 273. In some embodiments, flats may cover the entirety of first and second major surfaces 271, 273, while in other embodiments the flats 319a, 319b may only cover a portion of the first and second major surfaces. Grinding and machining operations can be used to create tightly toleranced features. For example, flats 319a, 319b may be precision ground to form a pair of surfaces that are substantially flat and a precise distance apart. Tightly toleranced component geometry may be beneficial for subsequent assembly operations and may further benefit the performance of particularly small connectors. In one embodiment, the perimeter of the connector body is less than 30 mm. Conductive frame 202 may be plated with one or more metals to achieve the desired finish.

Carrier 213 (see FIGS. 3A-3C), which is fabricated in step 424, may be a traditional epoxy and glass combination known as a printed circuit board (PCB) or may be any equivalent structure capable of routing electrical signals. In general, carrier 213 may be referred to as a PCB having a plurality of conductors formed thereon without limiting the scope of various embodiments. For example, some embodiments may use a flexible carrier 213 structure comprised of alternating layers of polyimide and conductive traces while other embodiments may use a ceramic material with conductive traces or a plastic material processed with laser direct structuring to create conductive traces. In further embodiments one portion of carrier 213 may be rigid while one or more other portions may be flexible. In some embodiments the entirety of carrier 213 may be flexible. In some embodiments, carrier 213 may be formed with a set of conductor bonding pads disposed at one end and a set of contact bonding pads disposed at the opposing end. In one embodiment the contact bonding pads are each split along a transverse direction into two separate bonding pads. Carrier 213 may also be equipped with one or more ground spring bonding pads to electrically connect one or more ground springs that make electrical contact with conductive frame 202. Additionally, in some embodiments, a set of component bonding pads (not shown) may be formed on carrier 213 to electrically connect one or more active or passive electronic components such as, for example, integrated circuits (ICs), resistors or capacitors. The embodiments depicted herein are for example only, other embodiments may have a different arrangement of bonding pads, more or less bonding pads, as well as bonding pads formed on either or both of the opposing sides of carrier 213, and fewer, more or different electronic components.

In embodiments that include electronic components, the components may be disposed on either side of carrier 213. In some embodiments a conductive epoxy may be used to electrically attach the electronic components to carrier 213. In other embodiments a solder alloy may be employed using myriad technologies such as, for example, through-hole mounting, stencil print and reflow, chip-on-board, flip-chip or other appropriate connection method. In one embodiment a stencil printing process is used to dispose solder paste on component bond pads.

Electronic components are then disposed on the solder paste and a convective heating process can be used to reflow the solder paste, attaching the electronic components to the carrier. The solder alloy may be a lead-tin alloy, a tin-silver-copper alloy, or other suitable metal or metallic alloy.

During the electronic component attachment process, solder paste may be deposited on contact bonding pads and reflowed. The reflow processing may form solder bumps 312 (1) ... 312(8) on the contact pads. The solder paste forms a bump during reflow processing due to the high surface tension of the solder when in its liquid state.

In some embodiments, after electronic components are attached to carrier 213, the assembly may be washed and dried. However, in other embodiments the assembly may not be washed until subsequent processing. In other embodiments a no-clean flux is used to aid the soldering process and there is no wash process. In further embodiments a no-clean or a cleanable flux is used to aid the soldering process and the assembly is washed. Finally, some or all of electronic components may be encapsulated with a protective material such as, for example, an epoxy, a urethane or a silicone based material. In some embodiments the protective encapsulant may provide mechanical strength for improved reliability and/or environmental protection from moisture for sensitive electronic components. In further embodiments the protective encapsulant may improve the dielectric breakdown voltage performance of connector 200. The encapsulant may be applied with an automated machine or with a manual dispenser.

The next step of assembly may involve forming a retainer 223 over a portion of carrier 213 (see FIG. 3B). In some embodiments, carrier 213 may have a first portion 310 positioned within conductive frame 202 (see FIG. 3A), a second portion 311 extending through retainer 223 and a third portion 201 extending out of the retainer at an angle with respect to the longitudinal plane of tab 204. In some embodiments third portion 201 extends out of retainer 223 at an angle between 45-135 degrees relative to the longitudinal plane of tab 204. In other embodiments the angle is between 65-115 degrees. In further embodiments the angle is between 80-100 degrees. Carrier 213 may have a plurality of conductors formed thereon and extending from first portion 310 to third portion 201 wherein each of the plurality of conductors has a contact region formed on the first portion and exposed at an outer surface of tab 204.

In some embodiments, carrier 213 may have a fourth portion 344 that extends from position 201 at an angle. In one embodiment fourth portion 344 is oriented substantially parallel to the longitudinal plane of tab 204. In some embodiments, first portion 310 is a rigid circuit board, whereas second portion 311, third portion 201 and fourth portion 344 are flexible circuit boards. In some embodiments, forming second portion 311 into a radius then molding it in place with retainer 223 may improve the reliability of carrier 213. In other embodiments, retainer 223 may support second portion 311 such that it is formed and maintained in a consistent and accurate position for improved signal integrity. In one embodiment, first portion 310 may be attached to third portion 201 where second portion 311 is an interface region between the first portion and the third portion. Retainer 223 may be formed over second portion 311. In further embodiments, retainer 223 may aid the assembly of carrier 213 into conductive frame 202. Retainer 223 may have one or more registration and/or alignment features that orient it within conductive frame 202. In some embodiments retainer 223 may have a tapered entry portion that aids alignment into entrance end 219 of tab 204. In further embodiments retainer 223 may have one or more retention features that retain it in entrance end 219 of tab 204. In some embodiments, retainer 223 may be overmolded on carrier 213. In other embodiments, retainer may be premolded in one or more pieces and be securable to carrier 213. In one embodiment, retainer 223 includes two pieces that snap together, securing carrier 213 between them. In some embodiments carrier 213 may have first and second locating holes 388a, 388b to aid in securing carrier 213 in place while retainer 223 is formed on the carrier.

Figure 3D:
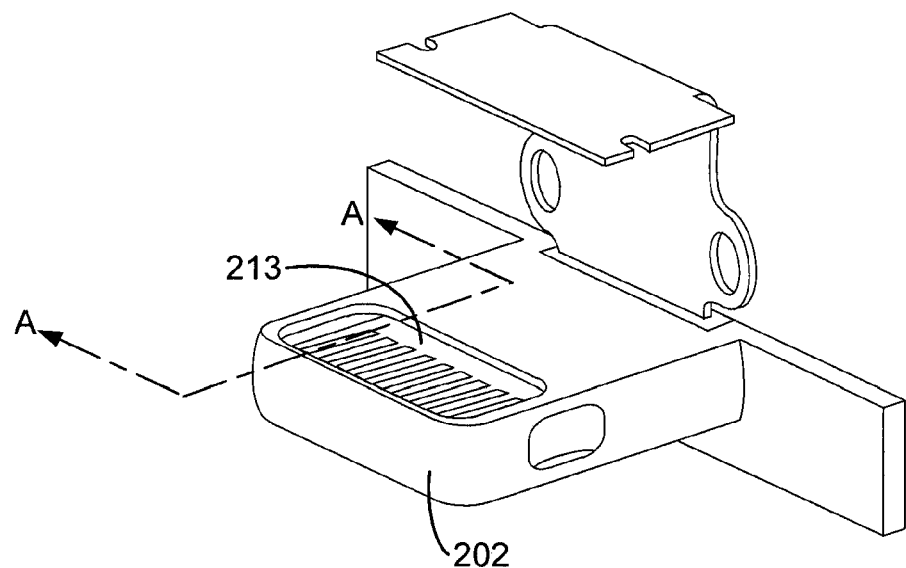
FIG. 3D is a rear perspective view of a carrier assembly installed in a conductive frame station according to an embodiment of the invention.
Figure 3E:
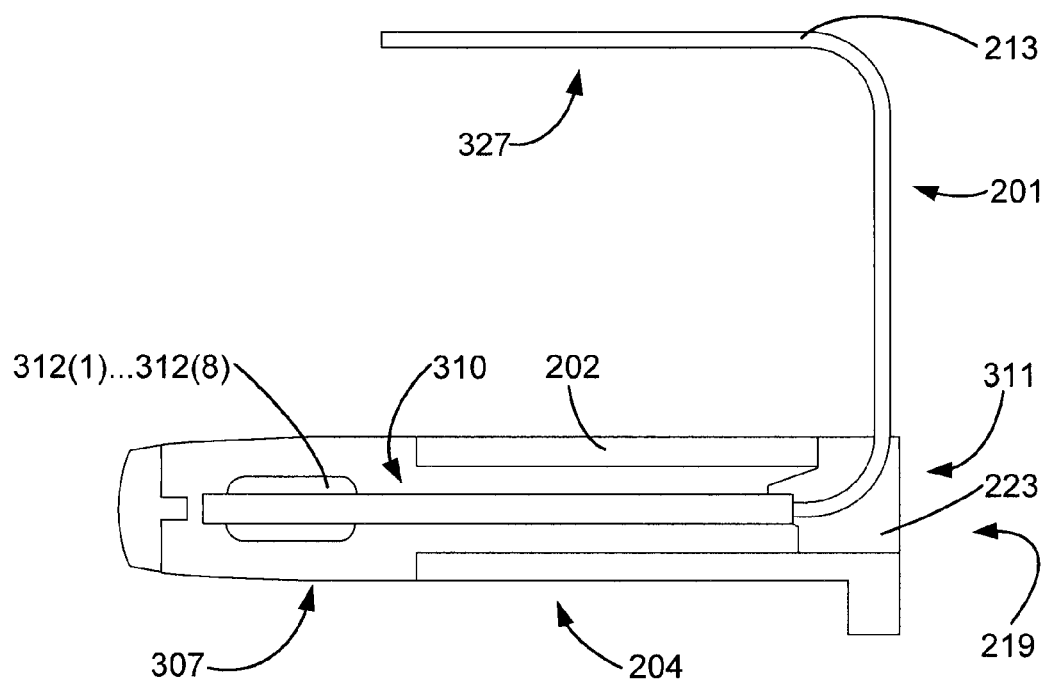
FIG. 3E is a cross-section of a carrier assembly installed in a conductive frame station according to an embodiment of the invention.

The next step of assembly may involve inserting carrier 213 with retainer 223 through entrance end 219 of tab 204 so that solder bumps 312(1) . . . 312(8) are positioned within window 307 (FIG. 4, step 428; FIGS. 3D and 3E). FIG. 3D depicts carrier 213 inserted into conductive frame 202. FIG. 3E depicts a longitudinal cross-section view of the assembly shown in FIG. 3D taken through line A-A. Further, it can be seen that solder bumps 312(1) . . . 312(8) disposed on contact bonding pads are aligned within window 307. In some embodiments the next step of assembly comprises depositing flux on solder bumps 312(1) . . . 312(8) through window 307. This can be done, for example, with an automated atomized spray nozzle, or by an operator with a dispenser.

Figure 3F:
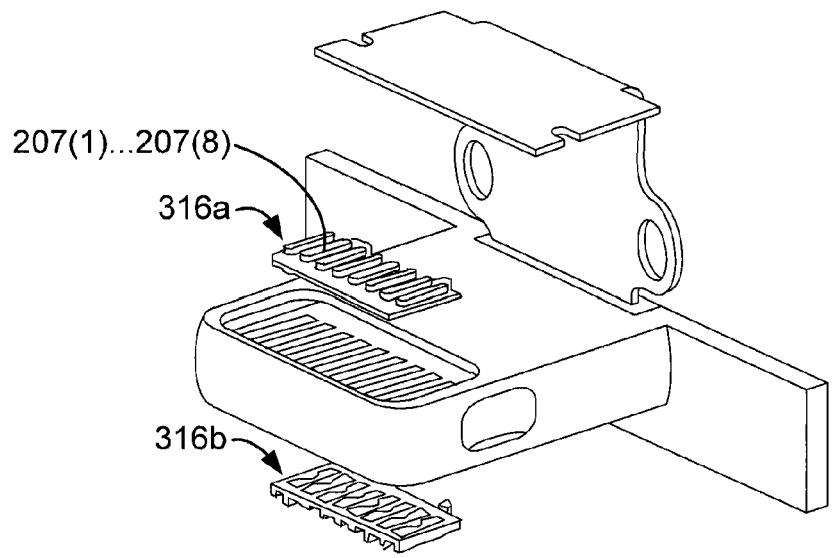
FIG. 3F is a rear perspective view of contact assemblies and a partially assembled plug connector station according to an embodiment of the invention.
Figure 4:
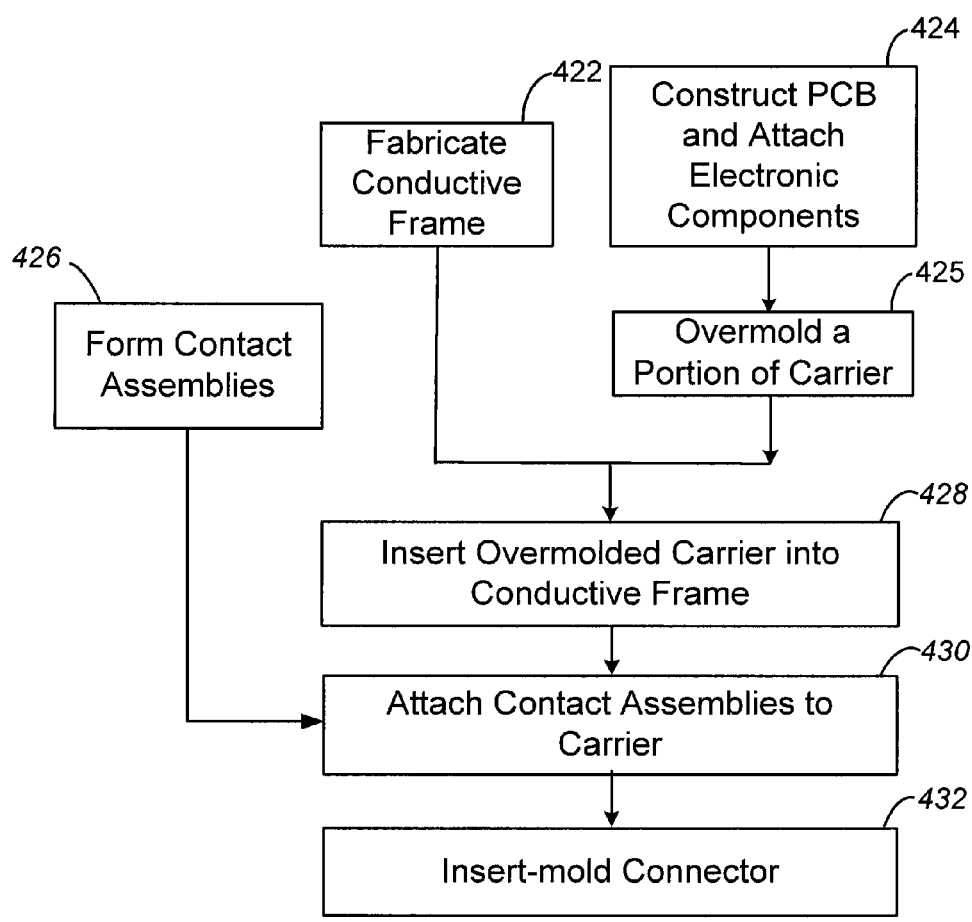
FIG. 4 is a process by which a plug connector having a carrier and a retainer may be assembled station according to an embodiment of the invention.
Figure 5:
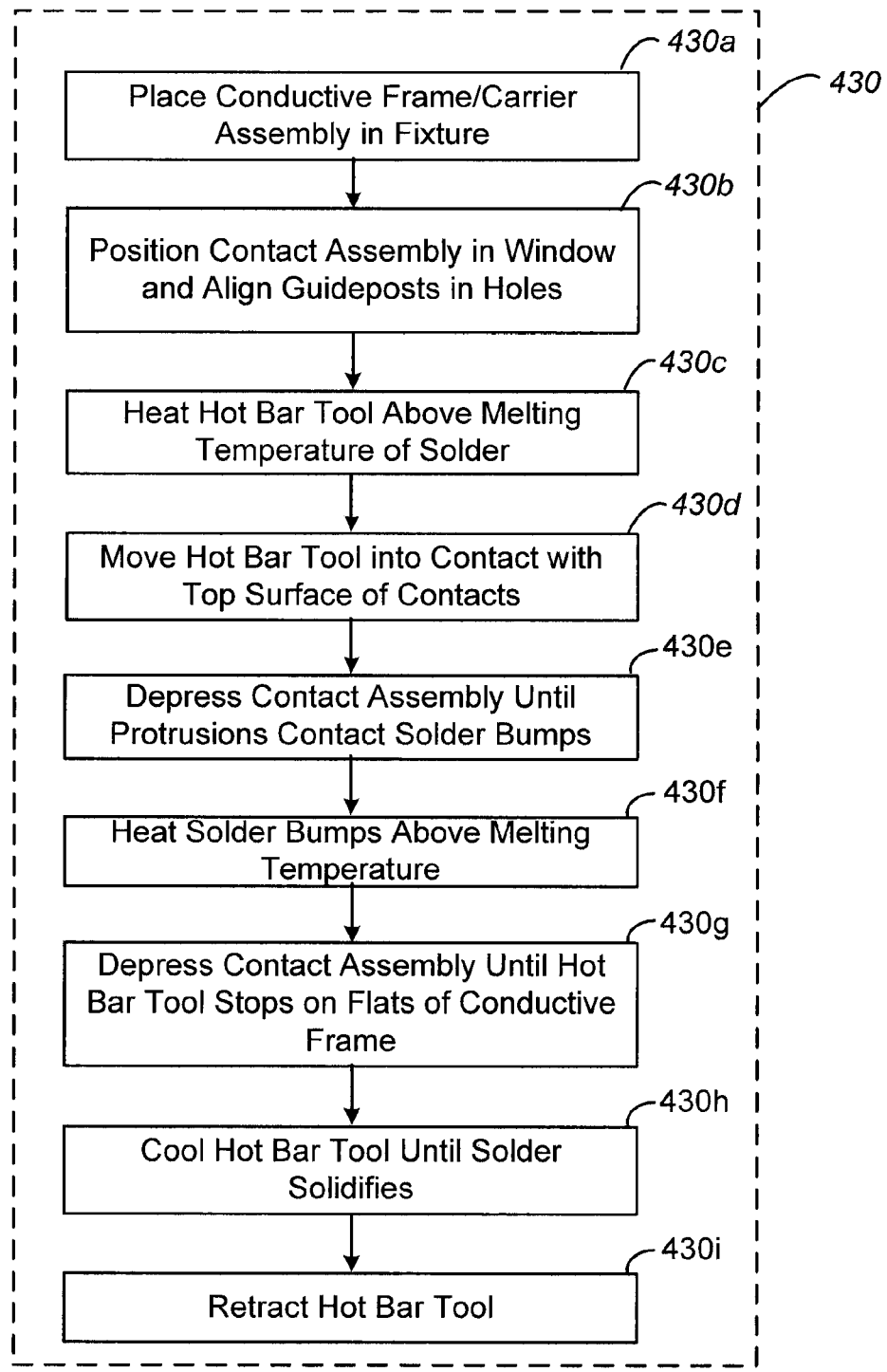
FIG. 5 is a process by which a contact assembly may be installed in a plug connector having a carrier station according to an embodiment of the invention.

Next, contact assemblies 316a, 316b (formed in FIG. 4, step 426) may be positioned within window 307 on each side of conductive frame 202 for attachment to carrier 213 (FIG. 4, step 430, FIGS. 3E-3F). Each contact assembly 316a, 316b may include a molded frame that can be formed from a dielectric material such as polypropylene. In other embodiments the frame is made of a liquid crystal polymer that may be partially filled with glass fiber. One embodiment has eight contacts 207(1) . . . 207(8) that are insert-molded and secured by the frame. The frame may be equipped with one or more alignment posts that protrude from a bottom surface of the frame and may fit within alignment holes in carrier 213 and are designed to align contact assemblies 316a, 316b with the carrier. In some embodiments, the frame may have alignment tabs disposed on the perimeter of the frame that align each frame within openings 307. Further, contact assemblies 316a, 316b may have one or more crushable combs that protrude from the bottom surface of the contact assembly and help ensure correct spacing between the contact assemblies and carrier 213 in the vertical direction.

Each contact 207(1) . . . 207(8) in contact assemblies 316a, 316b can be made from a variety of conductive materials, for example, phosphor-bronze, copper or stainless steel. Further, the contacts can be plated to improve their performance and appearance with, for example, nickel/gold, multi-layer nickel/gold, nickel/palladium, or any other acceptable metal. The contacts may be cut to size in a progressive stamping and forming process from a metal sheet and insert molded in contact assembly 316a, 316b. Each contact may be comprised of more than one metallic component and further, each contact may have one or more metallic protrusions (not shown) disposed on the bottom surface of the contact assembly.

Figure 3G:
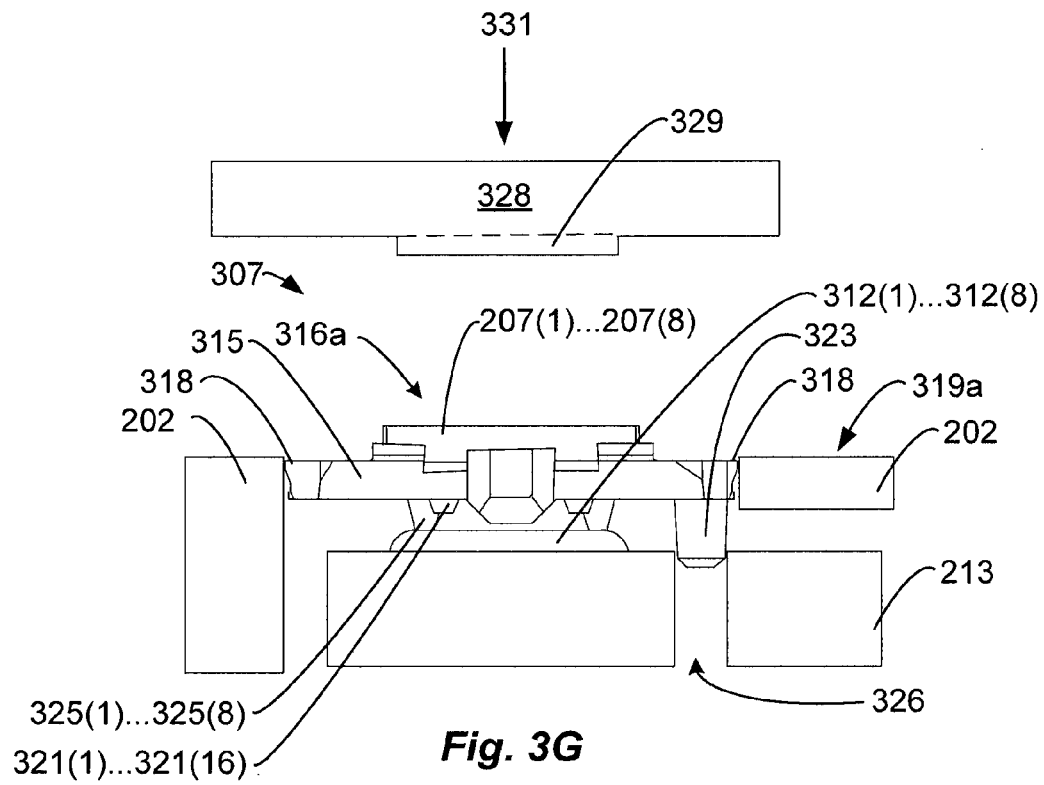
FIG. 3G is a front view of contact assemblies being installed in a partially assembled plug connector station according to an embodiment of the invention.
Figure 3H:
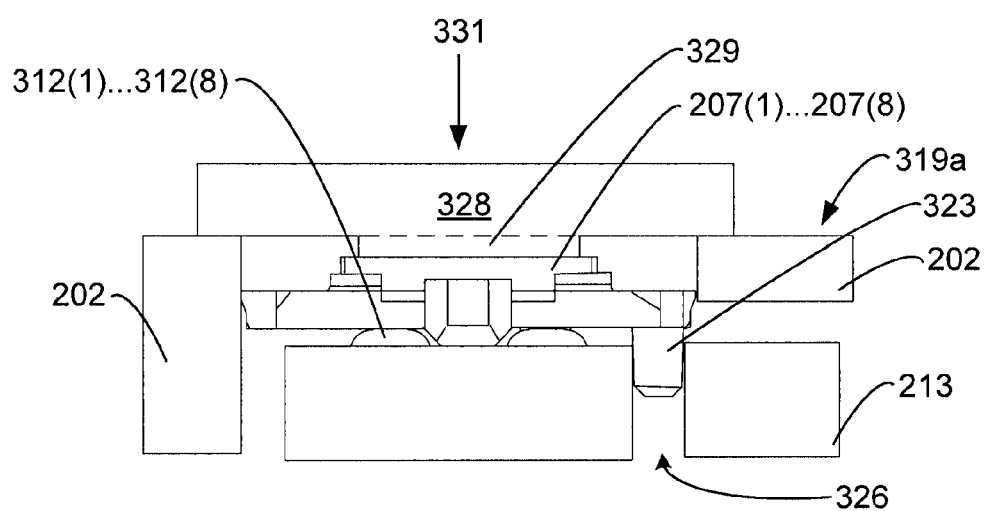
FIG. 3H is a front view of contact assemblies being installed in a partially assembled plug connector station according to an embodiment of the invention.
Figure 3I:
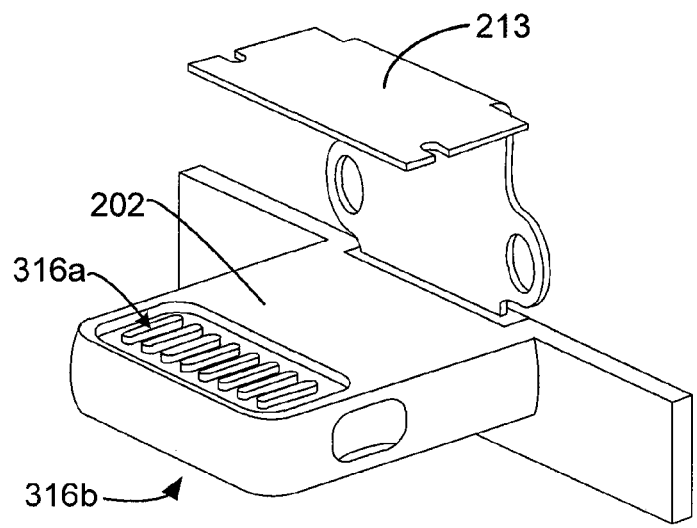
FIG. 3I is a rear perspective view of a plug connector having a carrier and a retainer station according to an embodiment of the invention.

Reference is now made to FIGS. 3G and 3H to illustrate the contact assembly attachment process for one particular embodiment. The detailed steps in the flow chart depicted in FIG. 5 will be used to illustrate the process employed in this embodiment. Conductive frame 202 and carrier 213 may be placed in a fixture to hold the components in place (FIG. 5, step 430a; FIG. 3G). Contact assembly 316a can be positioned in window 307 of conductive frame 202 and alignment posts 323 may be engaged with guide holes 326 in carrier 213 (FIG. 5, step 430b). Contact assembly alignment tabs 318 may precisely position contact assembly 316a in window 307. Crushable combs 325(1) . . . 325(8) may be in physical contact with carrier 213.

Now referring to FIG. 30H, a hot bar tool 328 with a step 329 can be used to hot bar solder contact assembly 316a to carrier 213. In step 430c, the hot bar tool may be heated to a temperature above the melting temperature of solder bumps 312(1) . . . 312(8). For example, if the solder bumps are composed of a tin/silver/copper alloy comprised of approximately three percent silver, one-half percent copper with the remainder tin, the hot bar tool may be heated above 221 degrees centigrade. The higher the temperature of the hot bar tool, the faster the solder may reflow. In step 430d, the hot bar tool may travel down, in the direction of arrow 331, towards the contact assembly until it physically touches the top surface of contacts 207(1) . . . 207(8). In step 430e, the hot bar tool may push the contact assembly further in the direction of arrow 331, partially deforming crushable combs 325(1) . . . 325(8) against carrier 213. The crushable combs may be designed specifically for this purpose and may impart a controlled amount of force resisting movement of contact assembly 316a in the direction of arrow 331. Alignment tabs 318 and alignment posts 323 may keep the contact assembly centered in window 307 (see FIG. 3C) during the assembly process. Step 329 of hot bar tool 328 may be precision formed to maintain the top surface of contacts 207(1) . . . 207(8) coplanar and at a controlled height during the attachment process. In step 430e, the contact assembly may be further pushed in the direction of the arrow until contact protrusions 321(1) . . . 321(16) come into contact with solder bumps 312(1) . . . 312(8). Hot bar tool 328 may be configured to impart a controlled force in the direction of arrow 331 at this time so no damage to the contact assembly results.

As mentioned above, solder bumps 312(1) . . . 312(8) may be coated with flux. In some embodiments the coating of flux may not only improve the wetting of the solder to contact protrusions 321(1) . . . 321(16), it may also enable more efficient heat transfer from contacts 207(1) . . . 207(8) to the solder bumps. In step 430f, hot bar tool 328 may transfer thermal energy through the contacts and into the solder bumps. Once an adequate amount of thermal energy has been transferred into the solder bumps, they may transition to a liquid state when heated above their melting temperature. Once in a liquid state, the solder bumps offer little resistance to additional movement of contact assembly 316a in the direction of arrow 331. In step 430g, the contact assembly may then be pushed further by the hot bar tool, causing increased deformation of crushable combs 325(1) . . . 325(8), until the hot bar tool "stops" on flat 319a of conductive frame 202. FIG. 3H depicts the stop position of the hot bar tool. In this figure it can be seen that step 329 of hot bar tool 328 may be used to precisely position the top surface of contacts 207 (1) . . . 207(8) a known distance below flat 319a of metal frame 202. In some embodiments, step 329 has a height between 0.1 and 0.01 mm and thus recesses the contacts 207(1) . . . 207(8) that same amount from surface 319a of metal frame 202. In other embodiments, step 329 is not included and the contacts are pressed flush with flat 319a. Also, during step 430g, contact protrusions 321(1) . . . 321 (16) on the bottom surface of contact assembly 316a may be wetted by the liquefied solder bumps 312(1) . . . 312(8). In step 430h, the hot bar tool may then be cooled until the liquefied solder bumps cool to a temperature below the liquidus temperature of the solder alloy and solidify. In step 430i, the hot bar tool may then be then retracted and the assembly can be removed from the fixturing.

In some embodiments the contact attachment process is performed on one side of metal frame 202 at a time, while in other embodiments the process is performed simultaneously on both sides of the metal frame. In some embodiments crushable combs 325(1) . . . 325(8) may deform between 0.02 mm and 0.12 mm. In other embodiments the crushable combs may deform between 0.05 mm and 0.09 mm. In some embodiments the heating of the crushable combs by hot bar tool 328 makes them easier to deform. The partially assembled connector may look like FIG. 3I with contact assemblies 316a, 316b installed in either side of metal frame 202. The partially assembled connector may then be cleaned.

Figure 3J:
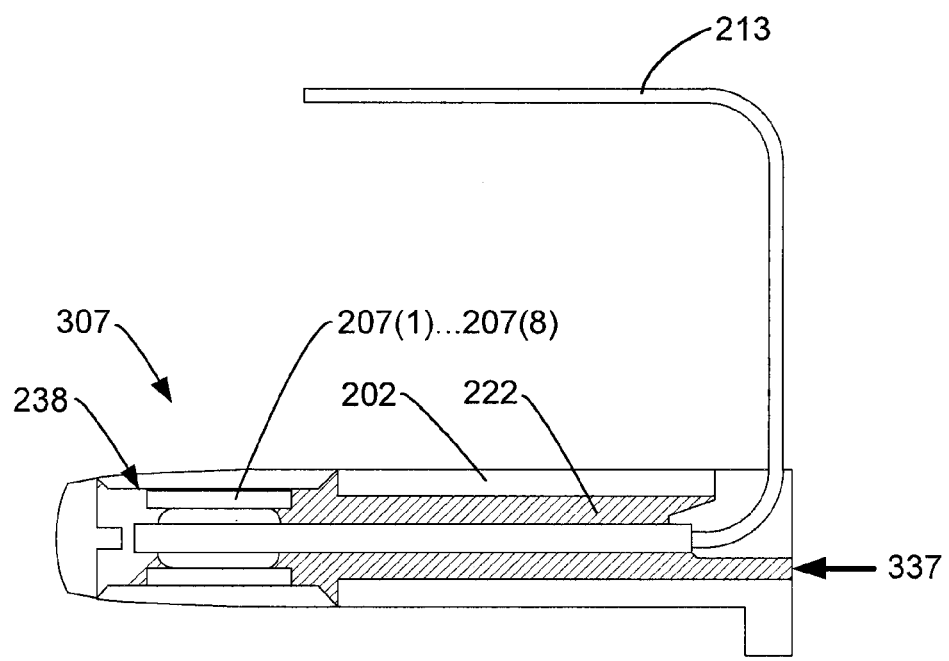
FIG. 3J is a cross-section of a plug connector having a carrier and a retainer station according to an embodiment of the invention.
Figure 3K:
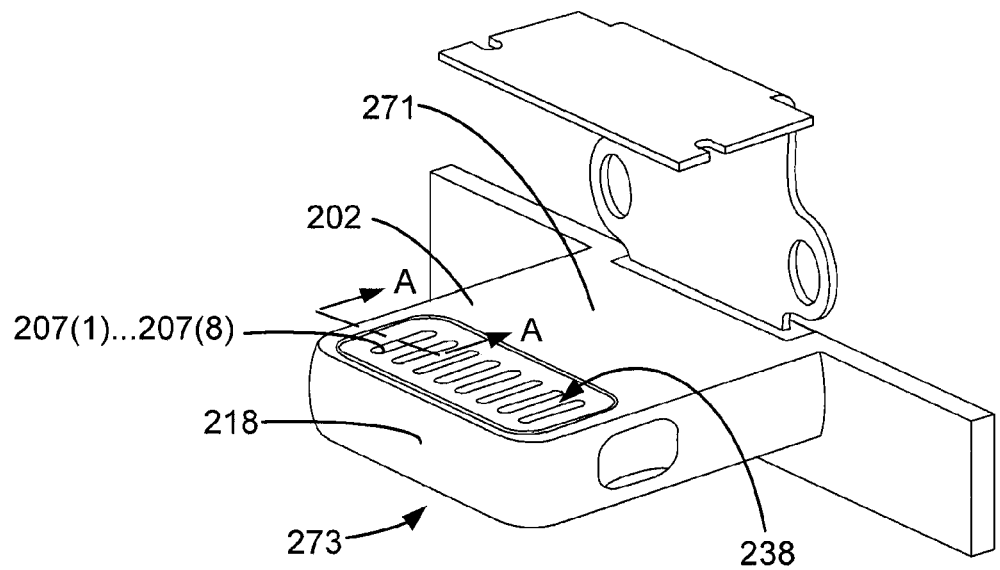
FIG. 3K is rear perspective view of a plug connector having a carrier and a retainer station according to an embodiment of the invention.
Figure 3L:
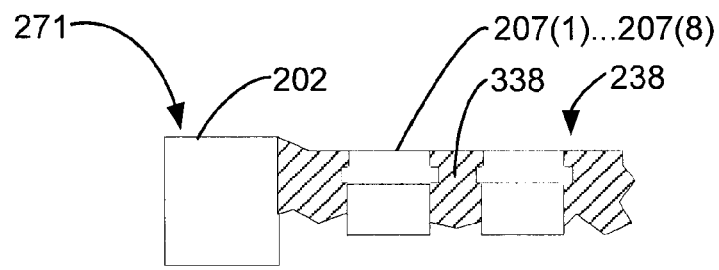
FIG. 3L is a cross-section of a plug connector having a carrier and a retainer station according to an embodiment of the invention.

The next step of assembly may involve placing a partially assembled connector (see FIG. 3I) in an insert molding tool and forming a thermoplastic or similar encapsulant 222 around contacts 207(1) . . . 207(8) and within window 307 of metal frame 202 (FIG. 4, step 432; FIGS. 3J-3L). This process may provide a smooth and substantially flat mating surface 238. The insert mold tool may be configured to inject dielectric encapsulant 222 from entrance end 219 of tab 204, shown generally by arrow 337. In one embodiment the insert mold tool has a recessed gate for injecting the dielectric overmold. In some embodiments, dielectric encapsulant 222 may be polyoxymethylene (POM). In other embodiments, dielectric encapsulant 222 may be a nylon-based polymer.

FIG. 3K depicts one embodiment after the insert molding process. In some embodiments, a mating surface 238 may be disposed below first major surface 271 of metal frame 202 and be substantially coplanar with the top surface of contacts 207(1) . . . 207(8). FIG. 3L shows a simplified cross-section A-A of FIG. 3K in the region of mating surface 238. From this illustration it can be seen that mating surface 238 may reside in a depression below first major surface 271 of the conductive frame 202. In some embodiments the depression may be between 0.01 to 0.1 mm below the top surface of conductive frame 202. This depression may protect contacts 207(1) . . . 207(8) from touching surfaces, such as that of a mating device, potentially causing damage to the top surface of the contacts. In some embodiments the recess may extend around the entire perimeter of window 307 (see FIG. 3C). In further embodiments the recess may be deeper in some areas and shallower in others. In other embodiments the recess may be deeper towards the rear of the connector and substantially coplanar with first major surface 271 of conductive frame 202 towards distal end 218 of the connector. In yet further embodiments, mating surface 238 of dielectric encapsulant 222 may be substantially coplanar with flat 319a or first major surface 271 of metal frame 202. In some embodiments, dielectric encapsulant 222 may be used to aid in retaining the contacts within the connector. In some embodiments second major surface 273 of connector 200 may be manufactured in a similar fashion as discussed above, while in other embodiments the second major surface may have no contact assembly.

Figure 6A:
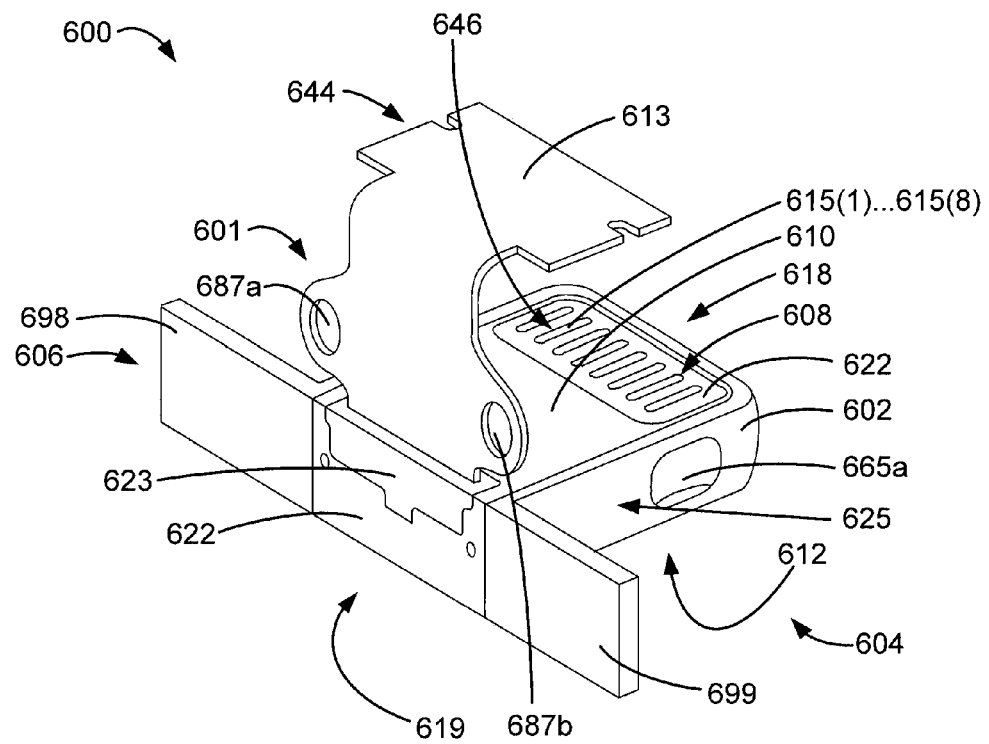
FIG. 6A is an illustration of a plug connector having a carrier, a circuit assembly and a retainer station according to an embodiment of the invention.
Figure 6B:
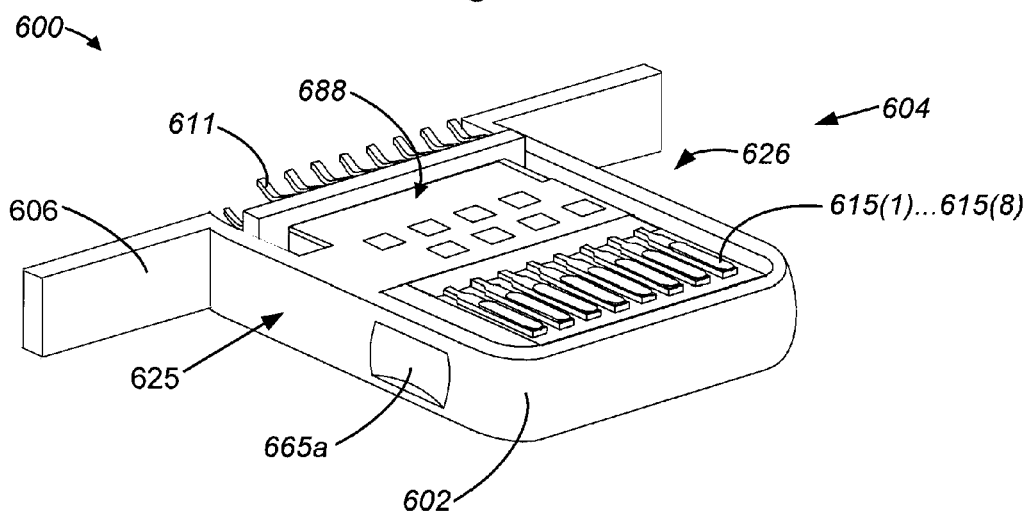
FIG. 6B is an illustration of a plug connector having a carrier, a circuit assembly and a retainer station according to an embodiment of the invention.

Another example plug connector 600 in accordance with an embodiment of the invention is illustrated in FIGS. 6A and 6B. This embodiment differs from the prior one in that instead of conductive frame 202 (see FIG. 3C) resembling a hollow shell, conductive frame 602 resembles a substantially u-shaped band. In addition, contacts 615(1) . . . 615(8) are disposed in a circuit assembly 688 that is disposed within conductive frame 602. These figures illustrate perspective views depicting an eight contact axisymmetric dual orientation plug connector assembly 600 that may include conductive frame 602 and encapsulant 622 filled within the frame according to embodiments of the present invention. Encapsulant 622 and carrier 613 have been removed in FIG. 6B for clarity. As shown in FIG. 6A, plug connector assembly 600 includes a connector tab 604 that extends longitudinally away from a flange 606. Connector tab 604 is sized to be inserted into a corresponding receptacle connector. Connector tab 604 includes a first mating surface 608 formed on a first major surface 610 that is opposite second major surface 612 of connector tab 604. In some embodiments a second mating surface 609 (not shown) is formed on second major surface 612. A plurality of electrical contacts 615(1) . . . 615(8) are disposed within mating surfaces 608, 609. First and second major surfaces 610, 612 extend from an entrance end 619 to a distal end 618 of connector tab 604. When connector tab 604 is inserted into a corresponding receptacle connector, major surfaces 610, 612 abut a housing of the receptacle connector or host device into which the receptacle connector is incorporated.

A retainer 623 is positioned at entrance end 619 of tab 604 and in some embodiments is formed from a material different than encapsulant 622. A carrier 613 has a first portion (not shown) positioned within conductive frame 602, a second portion extending through retainer 623 (not shown) and a third portion 601 extending out of the retainer at an angle with respect to the longitudinal plane of tab 604. In some embodiments third portion 601 extends out of retainer 623 at an angle between 45-135 degrees. In other embodiments the angle is between 65-115 degrees. In further embodiments the angle is between 80-100 degrees. Carrier 613 has a plurality of conductors formed thereon and extending from the first portion (not shown) to third portion 601. Each of the plurality of conductors has a mating surface formed on the first portion and exposed at an outer surface of plug 600. In some embodiments, carrier 613 may have a fourth portion 644 that is oriented substantially parallel with the longitudinal plane of tab 604. In one embodiment, first portion is a rigid circuit board, whereas second portion, third portion 601 and fourth portion 644 are flexible circuit boards. In some embodiments, forming the second portion into a radius then molding it in place with retainer 623 may improve the reliability of carrier 613. Retainer 623 may support the second portion such that it is not bent too far or too little and to maintain it in a consistent and accurate position for improved signal integrity. Retainer 623 may also aid the assembly of carrier 613 into conductive frame 602. Retainer 623 may have one or more registration and/or alignment features that orient it properly within conductive frame 602. In some embodiments carrier 613 may have first and second locating holes 687*a*, 687*b* to aid in the formation of retainer 623 on the carrier.

Tab 604 includes a substantially u-shaped conductive frame 602 that surrounds a portion of the periphery of connector 600. Conductive frame 602 extends along an entire length of tab portion 604 and includes first and second opposing extensions 698, 699 bent outward forming flange 606. Metallic band 602 may have retention features 665*a*, 665*b* formed in opposing third side surface 625 and fourth side surface 626. Retention features 665*a*, 665*b* may be part of a retention system that includes one or more features on plug connector 600 that are adapted to engage with one or more features on the corresponding receptacle connector to secure the connectors together when the plug connector is inserted into the receptacle connector.

As further illustrated in FIG. 6B, in one embodiment, connector 600 has a circuit assembly 688 that is disposed within conductive frame 602. Circuit assembly 688 couples contacts 615(1) . . . 615(8) to terminations 611. In some embodiments carrier 613 (see FIG. 6A) is coupled to circuit assembly 688 with terminations 611. Carrier 613 may be a traditional epoxy and glass combination known as a printed circuit board (PCB) or may be any equivalent structure capable of routing electrical signals and may have one or more flexible portions as discussed above. In further embodiments, one or more electronic components (not shown) can be operatively coupled to carrier 613 and/or circuit assembly 688 to provide information regarding connector 600 and any accessory or device that connector 600 is part of and/or to perform specific functions, such as authentication, identification, contact configuration and current or power regulation.

Conductive frame 602 may be fabricated using a variety of techniques such as, for example, stamping, wire forming, forging, metal injection molding (MIM), cold heading or a billet machining process. In some embodiments, alternative processes such as plastic injection molding and post plating with a metal may be used to form conductive frame 602. Conductive frame 602 may also have one or more alignment features (not shown) and contact assembly retention features (not shown) for aligning and retaining circuit assembly 688 in conductive frame 602. In some embodiments, conductive frame 602 may be formed from a metal or metal alloy. In one embodiment, conductive frame 602 is formed from stainless steel. In further embodiments, conductive frame 602 may be plated with a metal, such as but not limited to, nickel or gold.

In some embodiments, dielectric encapsulant 622 may be polyoxymethylene (POM). In other embodiments, dielectric encapsulant 622 may be a nylon-based polymer that may be filled with glass fiber. Further embodiments may employ other materials.

In the foregoing specification, embodiments of the invention have been described with reference to numerous specific details that may vary from implementation to implementation.

The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A plug connector comprising:
a flange;
a tab that extends away from the flange and is configured to be inserted into a corresponding receptacle connector, the tab including a conductive frame and encapsulant filled within the frame and having an entrance end disposed opposite a distal end and first and second opposing major surfaces extending between the flange and the distal end;
a retainer positioned at the entrance end of the tab and formed from a material different than the encapsulant;
a carrier having a first portion positioned within the conductive frame, a second portion extending through the retainer and a third portion extending out of the retainer at an angle with respect to the longitudinal plane, the carrier having a plurality of conductors formed thereon and extending from the first portion to the third portion, each of the plurality of conductors having a mating surface formed on the first portion and exposed at an outer surface of the plug.

2. The plug connector set forth in claim 1 wherein the conductive frame comprises a metal ground ring that generally defines a shape of the connector tab and includes openings on both the first and second major surfaces.

3. The plug connector set forth in claim 2 wherein contacts are disposed in the openings on both the first and second major surfaces and the contacts are surrounded by the encapsulant.

4. The plug connector set forth in claim 1 wherein the conductive frame comprises a substantially u-shaped metallic band disposed around a periphery of the plug connector such that the metallic band surrounds the distal end and third and fourth opposing side surfaces of the plug connector.

5. The plug connector set forth in claim 1 wherein the carrier extends out of the retainer at an angle of between 65-115 degrees with respect to the longitudinal plane.

6. The plug connector set forth in claim 1 wherein the third portion of the carrier comprises first and second locating holes.

7. The plug connector set forth in claim 1 wherein the carrier has a fourth portion oriented substantially parallel to the first portion.

8. A plug connector comprising:
a connector tab having an entrance end disposed opposite a distal end and first and second major surfaces disposed opposite each other extending between the entrance end and the distal end, wherein the connector tab further has a cavity extending from the entrance end to a pair of windows disposed proximate the distal end on the first and second major surfaces;
a plurality of conductors disposed at least partially within the cavity and exiting the connector tab through the entrance end;

the plurality of conductors further having an overmolded region, the overmolded region at least partially disposed within the cavity; and an encapsulant, substantially filling the cavity.

9. The plug connector set forth in claim 8 wherein at least a portion of the plurality of conductors is a circuit board.

10. The plug connector set forth in claim 9 wherein at least a portion of the circuit board is flexible.

11. The plug connector set forth in claim 9 wherein a portion of the circuit board is flexible and the flexible portion is disposed in the overmolded region.

12. The plug connector set forth in claim 8 wherein the encapsulant and the overmold are different materials and are both substantially coplanar with a bottom surface of the plug connector.

13. The plug connector set forth in claim 8 wherein there is a plurality of electrical contacts disposed in each of the pair of windows.

14. A plug connector comprising:

a tab made at least partially from an electrically conductive material, the tab comprising first and second major surfaces disposed opposite each other, and first and second minor surfaces disposed opposite each other, wherein the first and second major surfaces and the first and second minor surfaces extend from an entrance end of the tab to a distal end of the tab;

a plurality of contacts disposed in the first and second major surfaces proximate the distal end wherein the plurality of contacts are disposed entirely below the first and second major surfaces;

a plurality of electrical conductors connected to the plurality of contacts and exiting the connector tab through the entrance end wherein at least a portion of the plurality of electrical conductors is secured in an overmolded retainer; and wherein at least a portion of the overmolded retainer is disposed between the first and second major surfaces.

15. The plug connector set forth in claim 14 further comprising a flange disposed at the entrance end of the tab.

16. The plug connector set forth in claim 14 wherein at least a portion of the plurality of conductors are disposed within the overmolded retainer.

17. The plug connector set forth in claim 16 wherein the at least a portion of the plurality of conductors that are disposed within the overmolded retainer are formed into a radius.

18. The plug connector set forth in claim 16 wherein the plurality of conductors comprise a flexible printed circuit board (PCB).

19. The plug connector set forth in claim 18 wherein the overmolded retainer is formed over a curved portion of the flexible printed circuit board (PCB).

20. The plug connector set forth in claim 16 wherein the overmolded retainer is held in place by a second material formed by an insert molding operation performed on the tab.

* * * * *